(12) United States Patent
Chattopadhyay et al.

(10) Patent No.: US 12,191,552 B2
(45) Date of Patent: Jan. 7, 2025

(54) WAVEGUIDE BASED SUBMILLIMMETER-WAVE AND TERAHERTZ VARIABLE ATTENUATOR

(71) Applicant: California Institute of Technology, Pasadena, CA (US)

(72) Inventors: Goutam Chattopadhyay, Pasadena, CA (US); Jacob W. Kooi, Pasadena, CA (US); Choonsup Lee, La Palma, CA (US); Sofia Rahiminejad, Pasadena, CA (US); Subash Khanal, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 273 days.

(21) Appl. No.: 17/846,971

(22) Filed: Jun. 22, 2022

(65) Prior Publication Data
US 2022/0407200 A1  Dec. 22, 2022

Related U.S. Application Data

(60) Provisional application No. 63/213,430, filed on Jun. 22, 2021.

(51) Int. Cl.
| | | |
|---|---|---|
| H04B 1/04 | (2006.01) | |
| H01P 1/22 | (2006.01) | |
| H01P 11/00 | (2006.01) | |
| H04B 1/16 | (2006.01) | |

(52) U.S. Cl.
CPC .............. *H01P 1/222* (2013.01); *H01P 11/00* (2013.01); *H04B 1/04* (2013.01); *H04B 1/16* (2013.01)

(58) Field of Classification Search
CPC .. H04B 1/04; H04B 1/16; H01P 1/222; H01P 11/00

See application file for complete search history.

(56) References Cited

U.S. PATENT DOCUMENTS 3,934,334 A * 1/1976 Hanni ............... H05K 1/056
53/430
10,473,489 B1 * 11/2019 Potter ................ G02B 6/266
(Continued)

OTHER PUBLICATIONS

Rahiminejad, S., et al., "A MEMS Contactless Rotating Terahertz Waveguide Switch", 2022 IEEE 35th International Conference on Micro Electro Mechanical Systems Conference (MEMS), Jan. 2022, pp. 1-4.

(Continued)

*Primary Examiner* — Dominic E Rego
(74) *Attorney, Agent, or Firm* — GATES & COOPER LLP

(57) ABSTRACT

A waveguide based variable attenuator device including one or more attenuators each including a porous dielectric material; and a metal coating on the top of the dielectric material; and an actuator coupled to the attenuator. The actuator is configured to position, with nanometer resolution, the one or more attenuators in a waveguide configured and dimensioned to guide an electromagnetic wave having a frequency in a range of 100 gigahertz (GHz) to 1 terahertz (THz). The actuator controls at least one of a position or a volume of the one attenuator inserted in the waveguide to achieve a variable or pre-determined attenuation of the electromagnetic wave transmitted through waveguide.

20 Claims, 21 Drawing Sheets

(56) References Cited

U.S. PATENT DOCUMENTS

| | | | | |
|---|---|---|---|---|
| 2005/0279929 | A1* | 12/2005 | Youngquist | H01J 49/164 |
| | | | | 250/288 |
| 2006/0189039 | A1* | 8/2006 | Zhang | H01P 11/00 |
| | | | | 428/209 |
| 2007/0035935 | A1* | 2/2007 | Gottmann | H02K 11/028 |
| | | | | 361/800 |
| 2013/0007929 | A1* | 1/2013 | Porthun | H03L 7/099 |
| | | | | 850/8 |
| 2014/0328036 | A1* | 11/2014 | Sarraf | H05K 3/32 |
| | | | | 174/257 |
| 2018/0017702 | A1* | 1/2018 | Bendahan | G01V 5/224 |
| 2018/0085062 | A1* | 3/2018 | Lee | A61B 5/282 |
| 2019/0093213 | A1* | 3/2019 | Pollack | H01L 21/67742 |
| 2019/0225930 | A1* | 7/2019 | Chen | C12M 33/14 |
| 2021/0013569 | A1 | 1/2021 | Rahiminejad et al. | |
| 2022/0216729 | A1* | 7/2022 | Dyab | B60L 53/38 |
| 2024/0249946 | A1* | 7/2024 | Wallace | H01L 21/308 |

OTHER PUBLICATIONS

Q-521 Q-Motion® Miniature Linear Stage, https://www.physikinstrumente.com/en/products/linear-stages/miniature-linear-stages/q-521-q-motion-miniature-linear-stage-103151/#downloads, pp. 1-8, as downloaded Jun. 21, 2022. Reference [6].

Q-521 Q-Motion® Miniature Linear Stage, https://www.physikinstrumente.com/en/products/linear-stages/miniature-linear-stages/q-521-q-motion-miniature-linear-stage-103151/, pp. 1-6, as downloaded Jun. 21, 2022. Reference [6].

Q-Motion® Miniature Linear Stage—Smallest Linear Stage with Position Control, High Resolution and Affordable Price, pp. 1-6, Jun. 24, 2020. Reference [6].

Q-Motion® Positioners, MP139EK 4.2.0 Dec. 2019. 0.3, pp. 1-4. Reference [6].

Ren, J., et al., "High-Performance WR-4.3 Optically Controlled Variable Attenuator With 60-dB Range", IEEE Microwave and Wireless Components Letters, Jun. 2018, pp. 512-514, vol. 28, No. 6.

Fabeni, P., et al., Microwave variable waveguide attenuator, Review of Scientific Instruments, 2008, pp. 066104-1-066104-3, vol. 79.

Sasao, K., et al., "Variable Terahertz Attenuator Integrated on Nonradiative Guide Using Photoinduced Carriers", IEEE Transactions on Terahertz Science and Technology, May 2020, pp. 256-259, vol. 10, No. 3.

Wang, M., et al., "Electrically Tunable Hot-Silicon Terahertz Attenuator", Applied Physics Letters, Oct. 2014, pp. 1-7, vol. 105.

Nagatsuma, T., et al., "Challenges for Ultrahigh-Speed Wireless Communications Using Terahertz Waves" Terahertz Science and Technology, Jun. 2010, pp. 55-65, vol. 3, No. 2.

Rahiminejad, S., et al., "A Low-Loss Silicon MEMS Phase Shifter Operating in the 550-GHz Band", IEEE Transactions on Terahertz Science and Technology, Sep. 2021, pp. 477-485, vol. 11, No. 5.

* cited by examiner

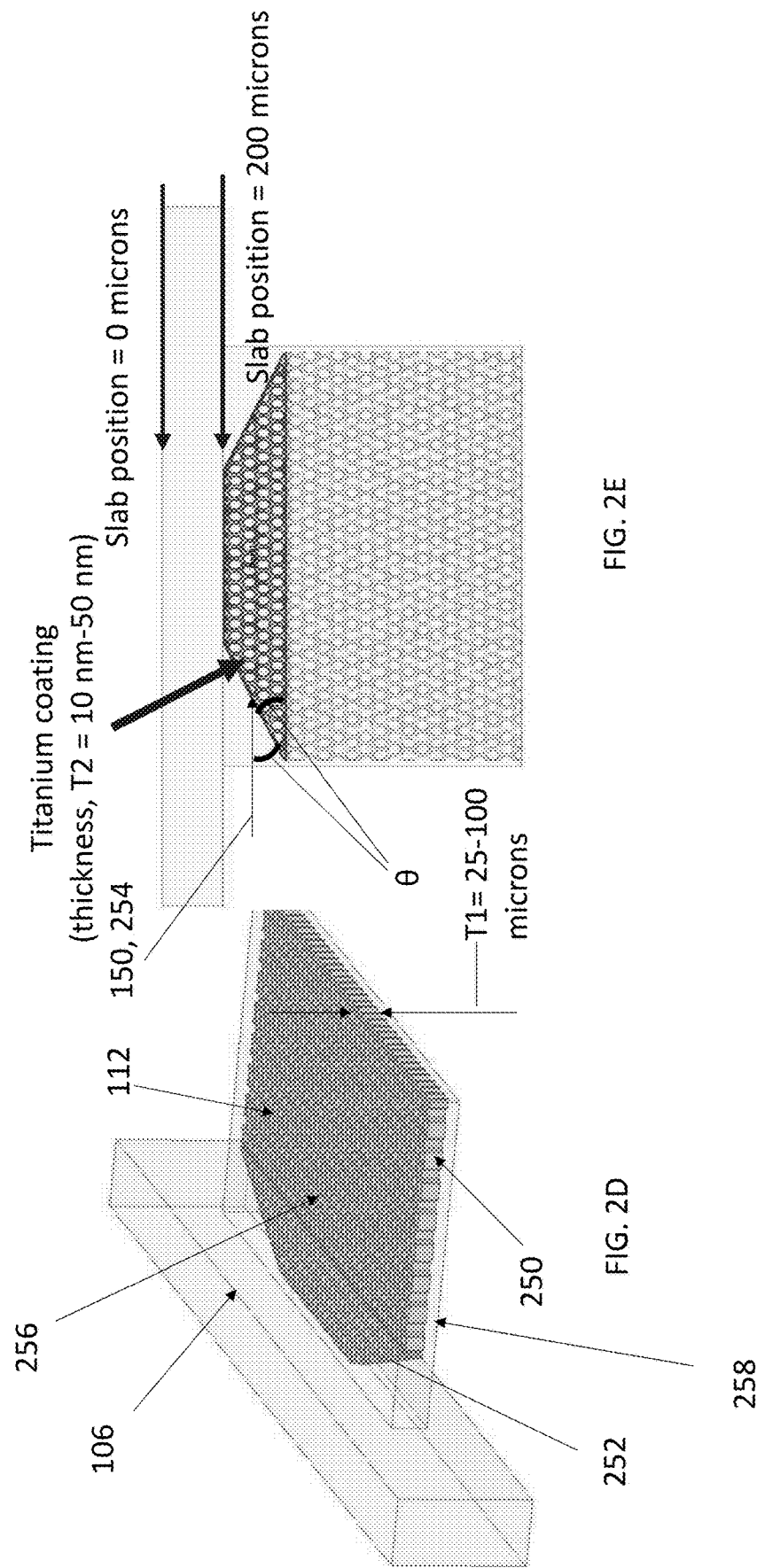

WAVEGUIDE BASED SUBMILLIMMETER-WAVE AND TERAHERTZ VARIABLE ATTENUATOR

CROSS REFERENCE TO RELATED APPLICATIONS

This application claims the benefit under 35 U.S.C. Section 119(e) of commonly-assigned U.S. provisional patent application Ser. No. 63/213,430 filed on Jun. 22, 2021, by Goutarn Chattopadhyay, Jacob. W. Kooi, Choonsup Lee, and Subash Khanal, entitled "WAVEGUIDE BASED SUB-MILLIMETER-WAVE AND TERAHERTZ VARIABLE ATTENUATOR,", which application is incorporated by reference herein.

STATEMENT REGARDING FEDERALLY SPONSORED RESEARCH AND DEVELOPMENT

This invention was made with government support under Grant No. 80NMO0018D0004 awarded by NASA (JPL). The government has certain rights in the invention.

BACKGROUND OF THE INVENTION

1. Field of the Invention

This invention relates to Terahertz (THz) attenuators and methods of making the same.

2. Description of the Related Art

Advancements in Terahertz source and detector technology are opening up new applications for THz bands including, but not limited to, space THz communication systems with very high data rates [5] or applications requiring efficient control and handling capability of high power THz signals. A compact waveguide-based tuneable attenuator solution, integratable with such THz systems, would be highly desirable. The present invention satisfies this need.

SUMMARY OF THE INVENTION

Embodiments of the inventive subject matter disclosed herein include, but are not limited to, the following.
1. device, comprising:
one or more attenuators each comprising:
a dielectric material and a pattern of holes in the dielectric material; and
a metal coating on the top of the dielectric material;
an actuator coupled to the attenuator, the actuator: comprising:
a motor coupled to a mount mounting the one or more attenuators, the actuator configured to:
position, with nanometer resolution, the one or more attenuators in a waveguide configured and dimensioned to guide an electromagnetic wave having a frequency in a range of 100 gigahertz (GHz) to 1 terahertz (THz); and
control the position or a volume of the one or more attenuators inserted in the waveguide to achieve a variable or pre-determined attenuation of the electromagnetic wave transmitted through the one or more attenuators and the waveguide.
2. The device of example 1, wherein the pattern comprises the holes having a width, a shape, a spacing, and an aspect ratio comprising the width of the hole divided by the unit cell area, wherein the width, the spacing, the aspect ratio and the shape tailor an impedance match of the dielectric material to the waveguide at a frequency band of interest.
3. The device of example 2, wherein the impedance match is such that 1% or less of a power of the electromagnetic wave incident (from the waveguide) on the dielectric material is reflected.
4. The device of example 1, wherein the pattern of holes are selected to tailor a permittivity of the attenuators so that a reflectivity of the dielectric material for the electromagnetic wave is less than 1% and a degree of attenuation of the electromagnetic wave is in a range up to 1 dB to 20 dB.
5. The device of example 4, wherein:
the pattern of holes control a porosity of the dielectric material so as to reduce the permittivity to obtain an impedance match of the dielectric material to the waveguide at a frequency band of interest and
a thickness of the dielectric material is selected to maintain a structural integrity for the slab the dielectric material at the selected porosity.
6. The device of example 1, wherein the dielectric material has a sidewall inclined at an angle of 20 to 70 degrees with respect of a direction of incidence of the electromagnetic wave on the dielectric material.
7. The device of example 1, wherein:
the holes have a width d and a unit cell area S, and
an aspect ratio comprising the width divided by the unit cell area is such that a permittivity of the attenuators $\varepsilon$ is tuned in a range $1 \leq \varepsilon \leq$ permittivity of the dielectric material; and
the dielectric material has a thickness in a range of 25-100 microns.
8. The device of example 1, wherein the holes have a hexagonal shape.
9. The device of example 1, wherein the metal coating consists essentially of titanium and the dielectric material consists essentially of silicon.
10. The device of example 9, wherein the metal coating has a thickness of 10 nm to 50 nm.
11. The device of example 1, further comprising the mount holding a plurality of attenuators in a row (for a higher attenuation version), wherein at least one of the attenuators is offset.
12. The device of example 1, wherein the dielectric material has a cross-sectional shape comprising an isosceles trapezoid such that the electromagnetic wave is incident on an inclined side of the isosceles trapezoid for impedance matching.
13. The device of example 1, further comprising the waveguide comprising a hollow waveguide having a rectangular cross-section and a metal surface with gold plating.
14. The device of example 1, further comprising:
a first metal block comprising one or more first sections of one or more of the waveguides;
a second metal block comprising one or more second sections of the one or more waveguides; and
the one or more attenuators between the first block and the second block such that each of the first sections mate with one of the second sections to form the one or more waveguides guiding the electromagnetic wave and each of the waveguides are coupled to one or more attenuators; and wherein
a top surface of the attenuators face the first block, a bottom of the attenuators face the second block, and the electromagnetic wave is incident on side edges of the attenuators.

15. The device of example 14, wherein the mount comprises a silicon substrate and the dielectric material comprises a porous layer on the silicon substrate, the silicon substrate further comprising pockets, and the device further comprising a curved silicon alignment spring housed or seated in each of the pockets, the springs and pockets positioned on opposite corners of the silicon substrate so that the springs apply forces to the silicon substrate aligning the attenuator in an x and y direction in a plane between the surfaces of the metal blocks forming the waveguide.

16. The device of example 1, wherein the motor comprises a piezoelectric motor.

17. The device of example 1, wherein the motor comprises a Microelectromechanical systems (MEMS) motor.

18. The device of example 1, wherein the mount comprises a guide comprising a holder or tray interfacing the dielectric material to the motor, wherein the motor pushes the dielectric material via the holder or the tray.

19. A receiver or transmitter for the electromagnetic wave and comprising the device of example 1.

20. A system comprising the receiver or transmitter of example 13, wherein the system comprises:
a remote sensing system and the electromagnetic wave is used to perform remote sensing, or
a communications system and the electromagnetic wave transmits a signal.

21. A method of making an attenuator, comprising:
etching a dielectric material with a pattern of holes;
depositing a metal coating on the top of the dielectric material;
coupling an actuator to the dielectric material for controlling a position of the dielectric material, with nanometer resolution, in a waveguide configured and dimensioned to guide an electromagnetic wave having a frequency in a range of 100 gigahertz (GHz) to 1 terahertz (THz), and
providing guidance for controlling the position or a volume of the dielectric material inserted in a waveguide to achieve a desired or pre-determined attenuation of the electromagnetic wave.

22. The method of example 21, further comprising:
providing a silicon wafer including a buried oxide layer;
thermally oxidizing the silicon wafer to form a first thermal oxide on the silicon wafer
depositing photoresist on the first thermal oxide;
patterning the first thermal oxide with the pattern;
etching the pattern of the holes using inductively coupled plasma etching;
deep reactive ion etching the silicon wafer using the first thermal oxide as a first mask and a first side of the buried oxide layer as an etch stop, to define the pattern of holes.

23. The method of example 22, further comprising:
machining a first metal block so as to form a first section of a waveguide in the first metal block;
machining a second metal block so as to form a second section of the waveguide in the second block; and
assembling the attenuator between the first metal block and the second metal block so as to form the waveguide comprising the first section mating with the second section and the attenuator coupled to the waveguide guiding the electromagnetic wave.

BRIEF DESCRIPTION OF THE DRAWINGS

Referring now to the drawings in which like reference numbers represent corresponding parts throughout:

FIG. 2D-2E are close up view of the dielectric slab coupled to the waveguide.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized, and structural changes may be made without departing from the scope of the present invention.

Technical Description

Example Device Structures

Figure 1A:
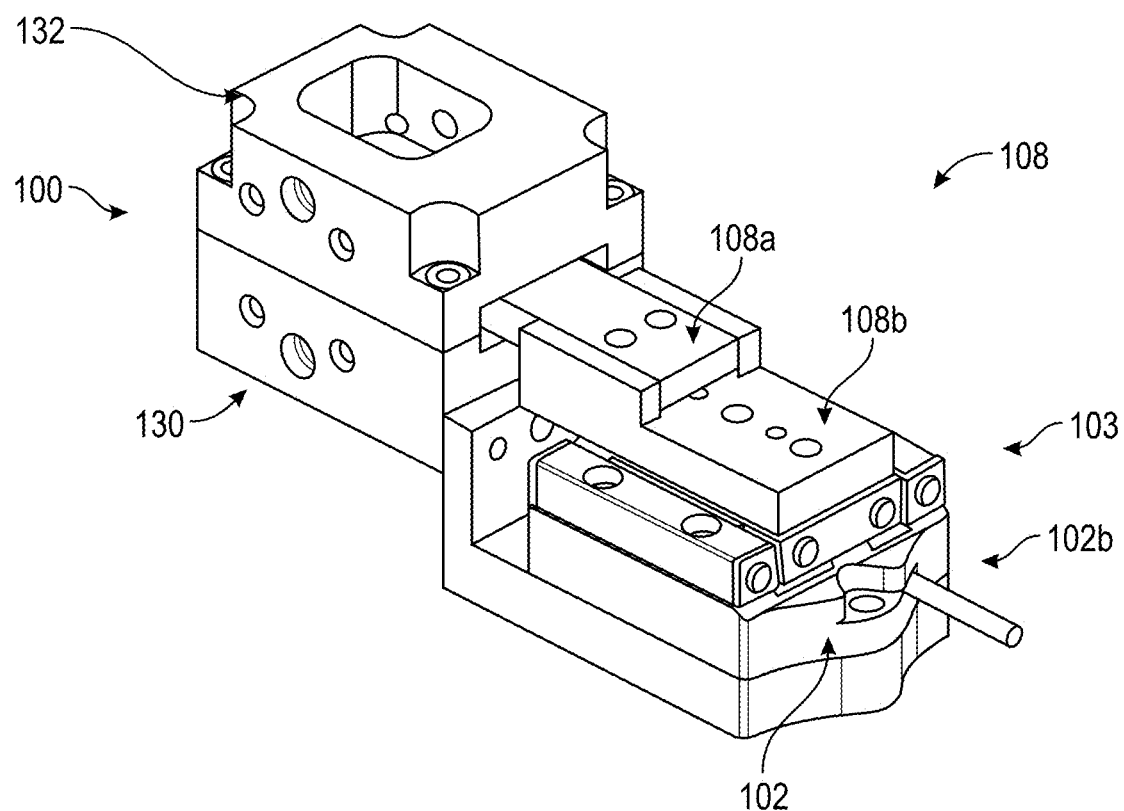
FIG. 1A illustrates a variable attenuator system integrated with a piezoelectric motor, according to a first embodiment, comprising a holder/tray for inserting the silicon slab. The device is designed to operate at the WR1.5 band (500-750 GHz) but can be scaled up and down in frequency as desired.
Figure 1B:
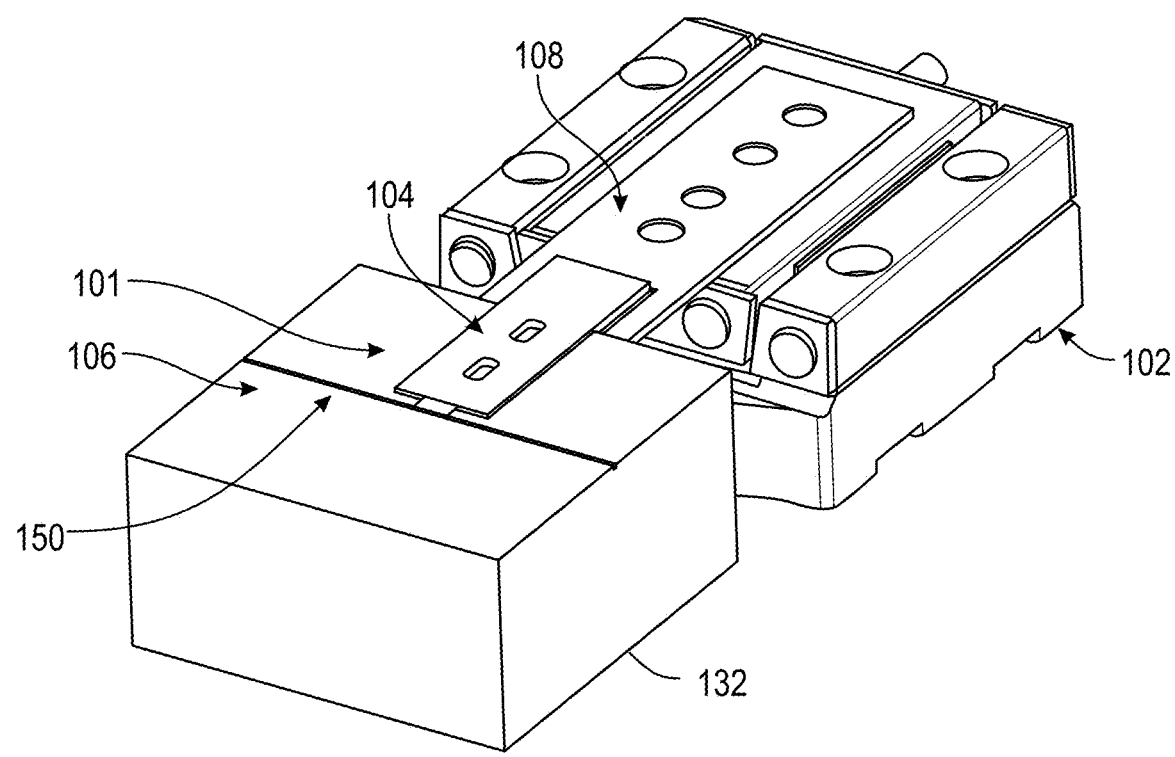
FIG. 1B illustrates a second example of a waveguide based variable attenuator integrated with a piezo electric motor.

FIGS. 1A-1B illustrate novel waveguide based variable attenuator systems 100 comprising an attenuator 101 integrated with an actuator 103 comprising a piezo electric motor 102 controlling attenuation with fine step resolution. In these examples, the attenuator 101 comprises a low-resistivity silicon slab 104 coated with titanium inserted in the waveguide 106. Precise control of the output signal power is controlled by precisely, positioning the slab inside the waveguide using the (e.g., miniature) nanometer-scale precision piezo electric motor [6] and mount 108 comprising a guide or tray 108a and a tray holder 108b. The waveguide 106 is defined by metal blocks 130, 132.

Figure 2A:
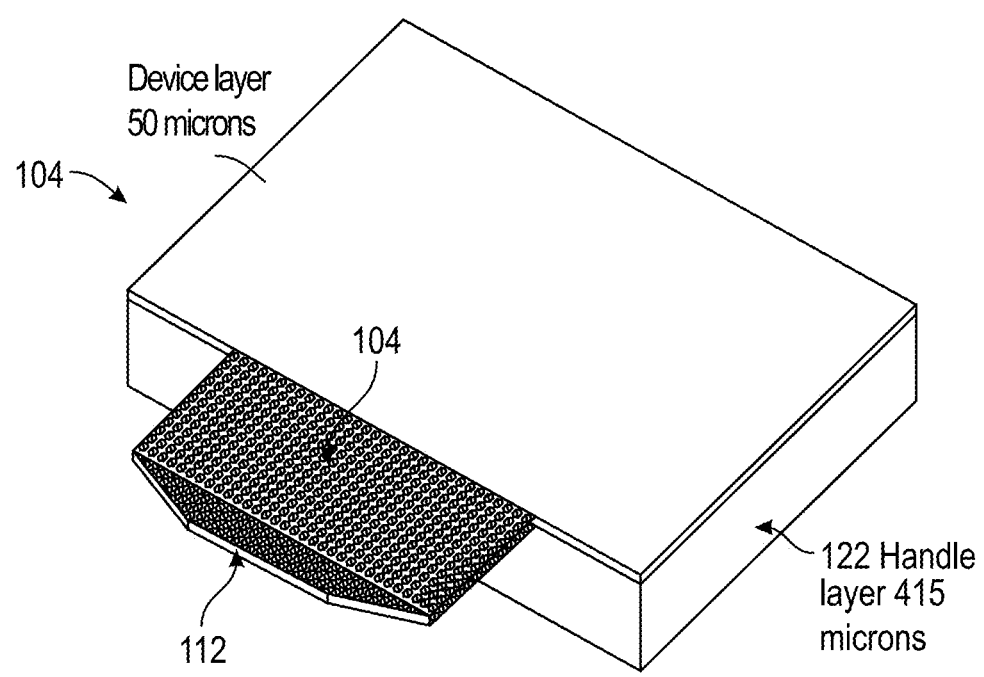
FIG. 2A illustrates an embodiment of the attenuator comprising a handle layer and a device layer comprising perforated silicon on the device layer
Figure 2B:
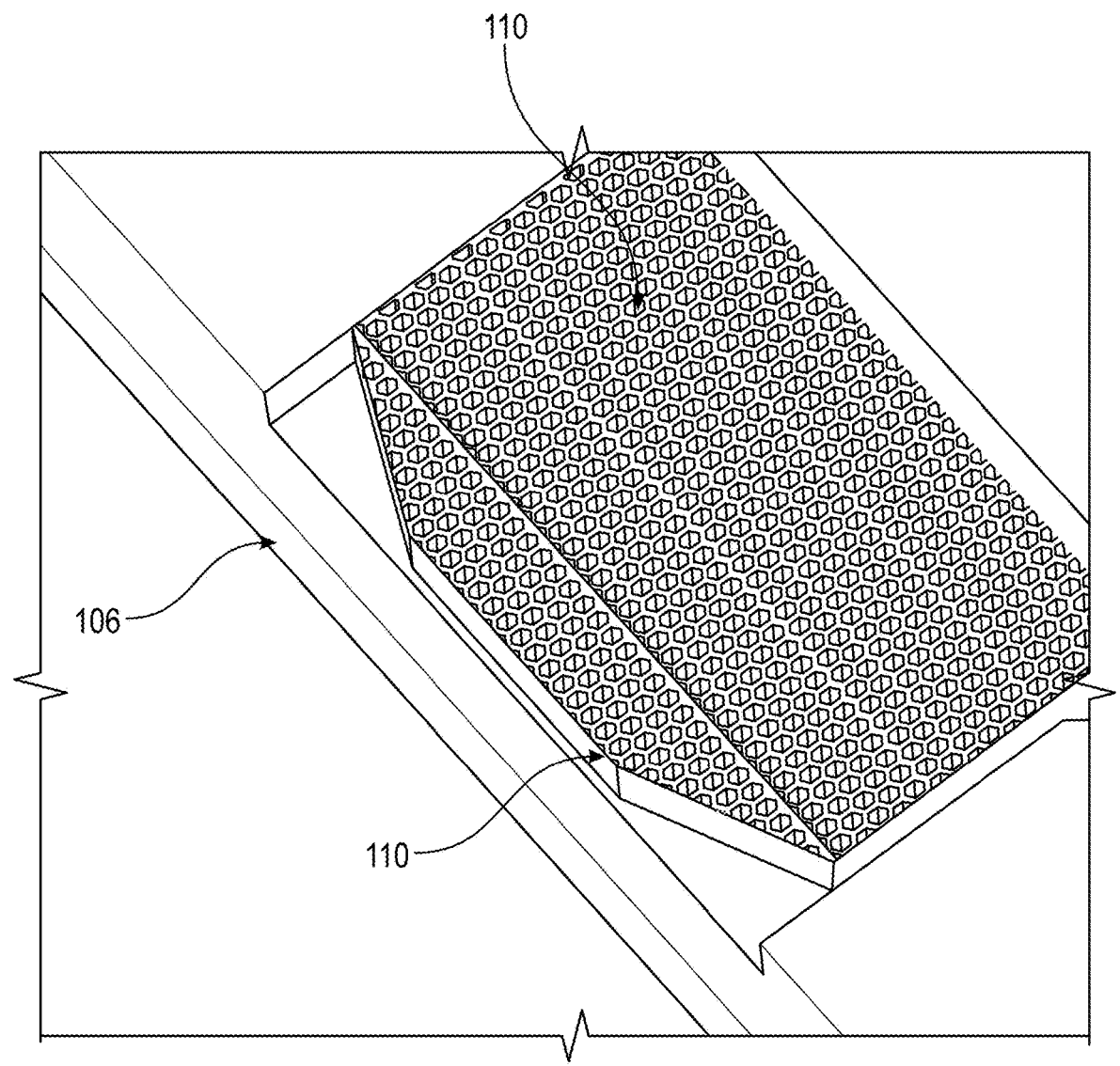
FIG. 2B illustrates coupling of the attenuator to the waveguide, illustrating how the low-resistivity silicon slab coated with titanium is inserted in the waveguide. Precise control of the output signal power (control of attenuation with fine step attenuation) is achieved by precisely positioning the slab inside the waveguide using the miniature nanometer-scale precision piezo electric motor.
Figure 2C:
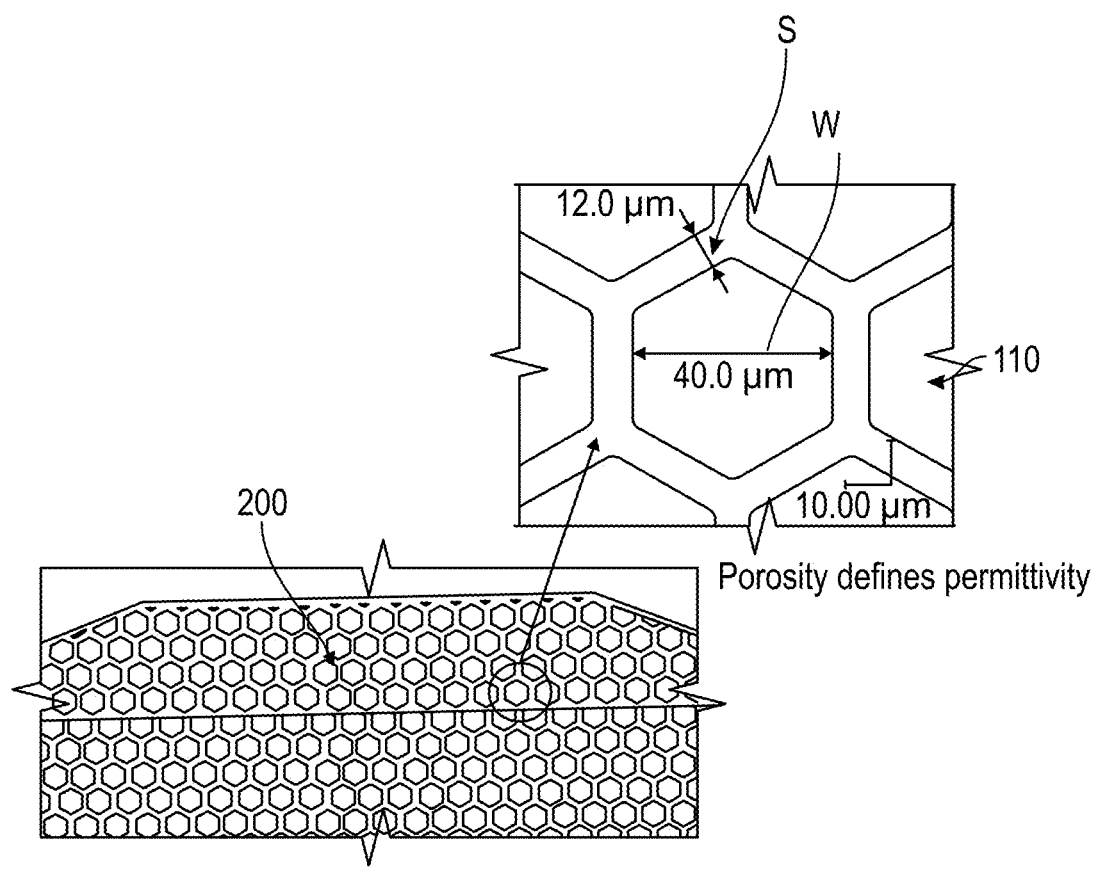
FIG. 2C is a micrograph of the perforated portion (with a hexagonal pattern) of the slab that slides in and out of the waveguide to control the amount of signal attenuation.

FIG. 2A-2C are close up view of the dielectric slab 104 coupled to the waveguide 106. Impedance matching is realized by perforating the silicon slab with a pattern of holes 110 or a porosity 200 (comprising pores). Without being bound by a scientific theory, the silicon slab attenuates by absorbing some of the electromagnetic wave(s) 150 traveling through the waveguide. Thus, key design parameters are the absorption coefficient and the volume of the titanium coated silicon slab inside the air-filled waveguide, since the amount of signal absorbed by the slab is determined by the sheet resistance value of the titanium coating 112 and the position of the slab in the waveguide.

Without being bound by a particular scientific theory, the amount of porosity on the silicon slab 104 determines the impedance matching. More pores 110 results in a lesser amount of dielectric material (silicon) which means less permittivity. However, there is fabrication limit on how much dielectric material can be removed from a solid slab—the thickness of the walls between the hexagonal patterns cannot be too thin. In one or more examples, the wall thickness, i.e., parameter 'S' can be tuned between 10 micrometers to 100 micrometers. However, thinner is desirable as the impedance matching is detrimentally impacted for thicker slabs. FIG. 2D further illustrates example thickness T1 of the porous layer or section 250 may be in a range of 30 microns to 100 microns.

In terms for shape of the perforations or holes 110, any shape can be chosen such as, but not limited to, round or circular, square, etc. However, in this design, a hexagonal pattern was selected as it allows more open space per unit area compared to other perforation types/shapes and also this shape and pattern provides better stress distribution properties.

On the thickness of the metal coating 112, first fabricated prototype samples with 25 nm of titanium metal coating on the top of silicon slab were measured. However, other thicknesses are possible and FIG. 2D illustrates example thickness T2 of the metal coating can be in a range of 10 nm to 50 nm and a thickness FIGS. 2D and 2E illustrate the porous section or layer 250 (comprising the holes 110) of the dielectric material 104 has a sidewall 252 inclined at an angle θ with respect of a direction of incidence 254 of the electromagnetic wave 150 on the porous section 250. In terms of the sidewall inclination, nominal choice is 45 degrees. However, example ranges for the sidewall inclination include, but are not limited to 20 degrees to 70 degrees (20 degrees≤θ≤70 degrees).

In one or more examples, and without being bound by a particular scientific theory, hole pattern and porosity do not play any role on the signal attenuation (hole pattern and porosity are selected only for impedance matching and the attenuation is determined by the amount of metal coating we deposit on the surface Silicon.

Simulation Results

Figure 3A:
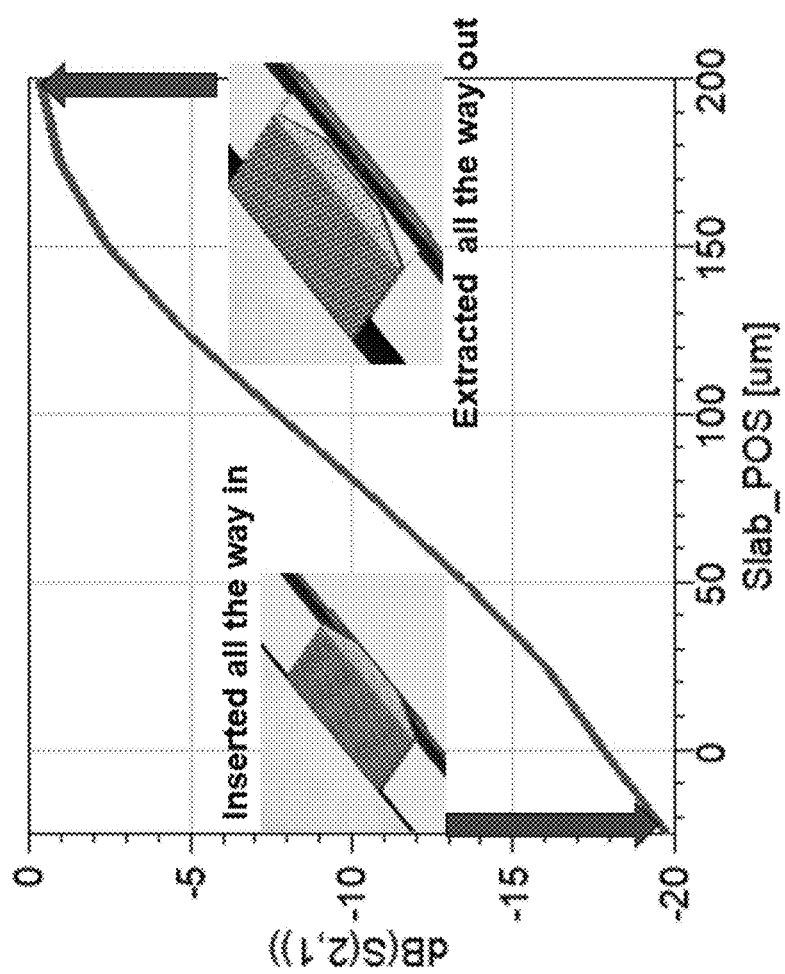
FIG. 3A plots simulated transmission coefficient (attenuation) versus position of the silicon slab on the signal path, for the embodiment of FIGS. 1A, 2A, and 2C. The slab is fully inserted in to waveguide when it moves 200 μm.
Figure 3B:
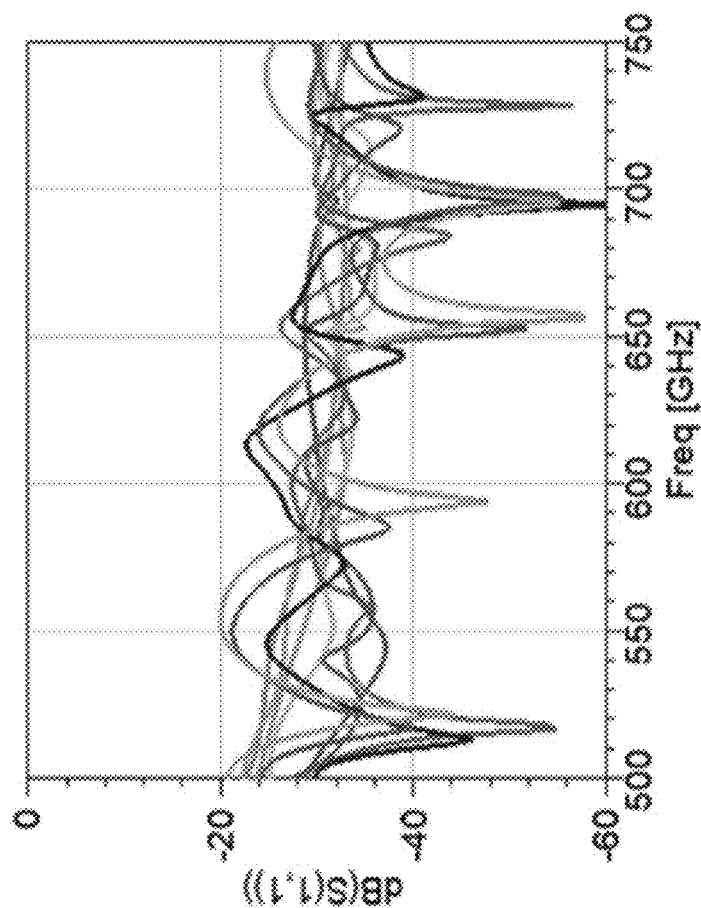
FIG. 3B plots simulated input return loss over full WR1.5 band (500-750 GHz) for the embodiment of FIGS. 1A, 2A, and 2C.
Figure 3D:
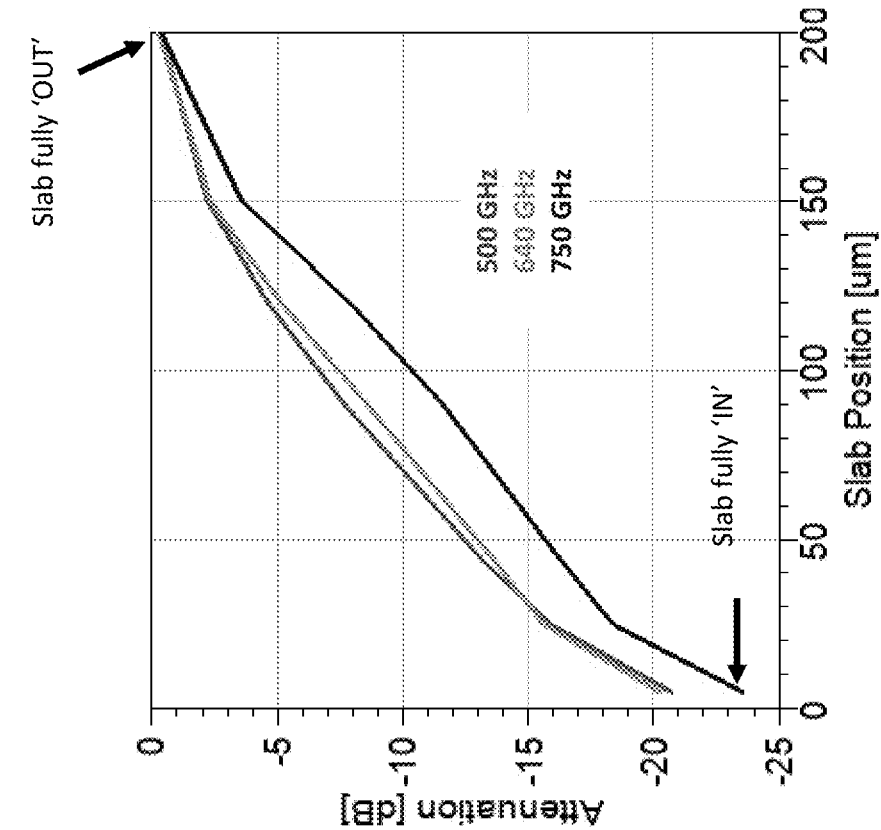
FIG. 3D plots simulated S parameter of the waveguide as a function of position of the attenuator relative to the waveguide, for the embodiment of FIGS. 1B, 2B, and 2D.
Figure 3C:
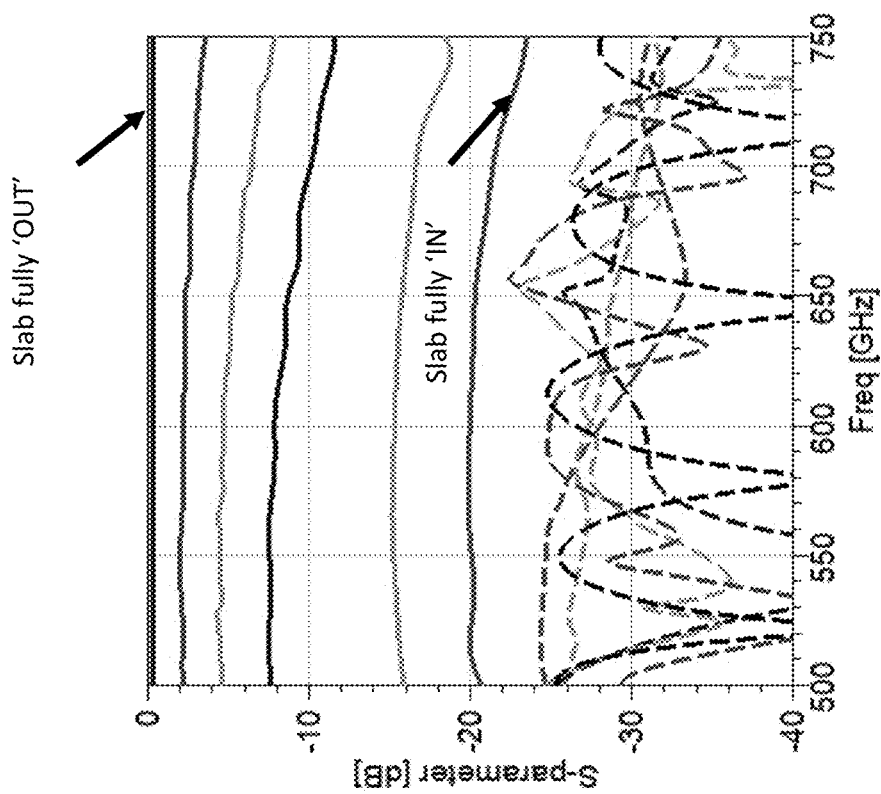
FIG. 3C plots simulated S parameter of the waveguide as a function of frequency of the electromagnetic wave and position of the attenuator relative to the waveguide, for the embodiment of FIGS. 1B, 2B, and 2D.

FIGS. 3A and 3C illustrate simulation results where signal attenuation up to 20 dB is achievable with a 1.75 mm long single slab of perforated silicon coated on the top surface with a Titanium (sheet resistance of 80 Ω/sq) metal coating. FIGS. 3B and 3D illustrate input return loss is below −20 dB over the whole frequency band.

Example Fabrication

Figure 4A:
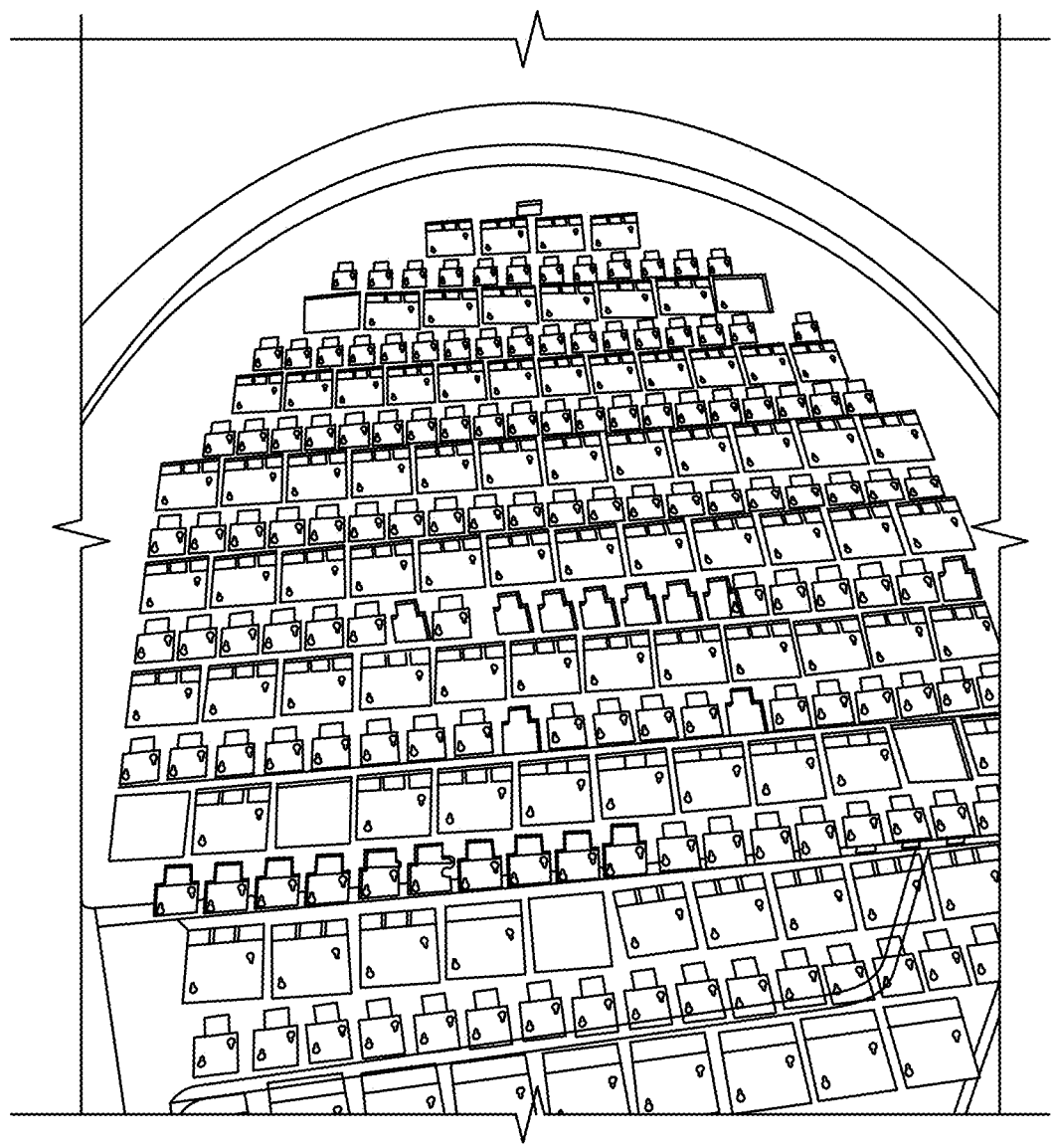
FIG. 4A illustrates micromachined silicon wafers with 25 nm of Ti metal coating.

FIG. 4A illustrates a micromachined silicon wafer with titanium coating.

Figure 4C:
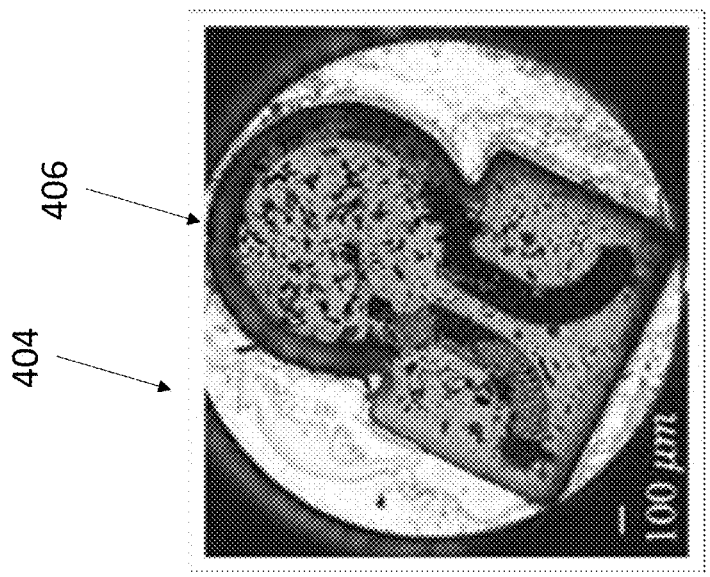
FIG. 4C illustrates silicon alignment springs for alignment of the dielectric slab in the waveguide.
Figure 4B:
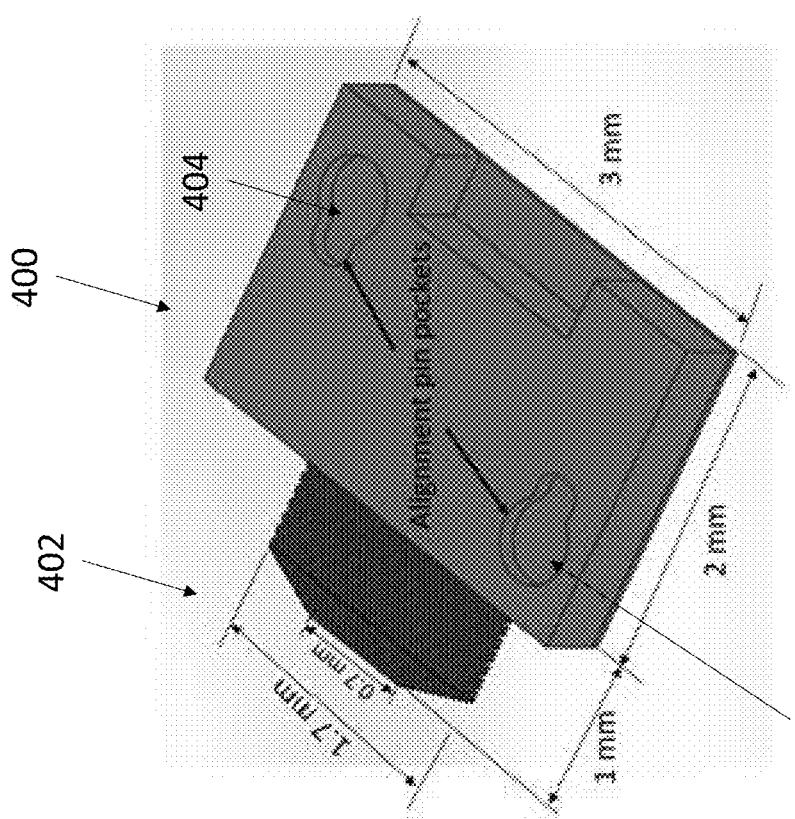
FIG. 4B illustrates example dimensions for a silicon slab comprising the porous dielectric material and pockets for seating alignment springs.
Figure 4D:
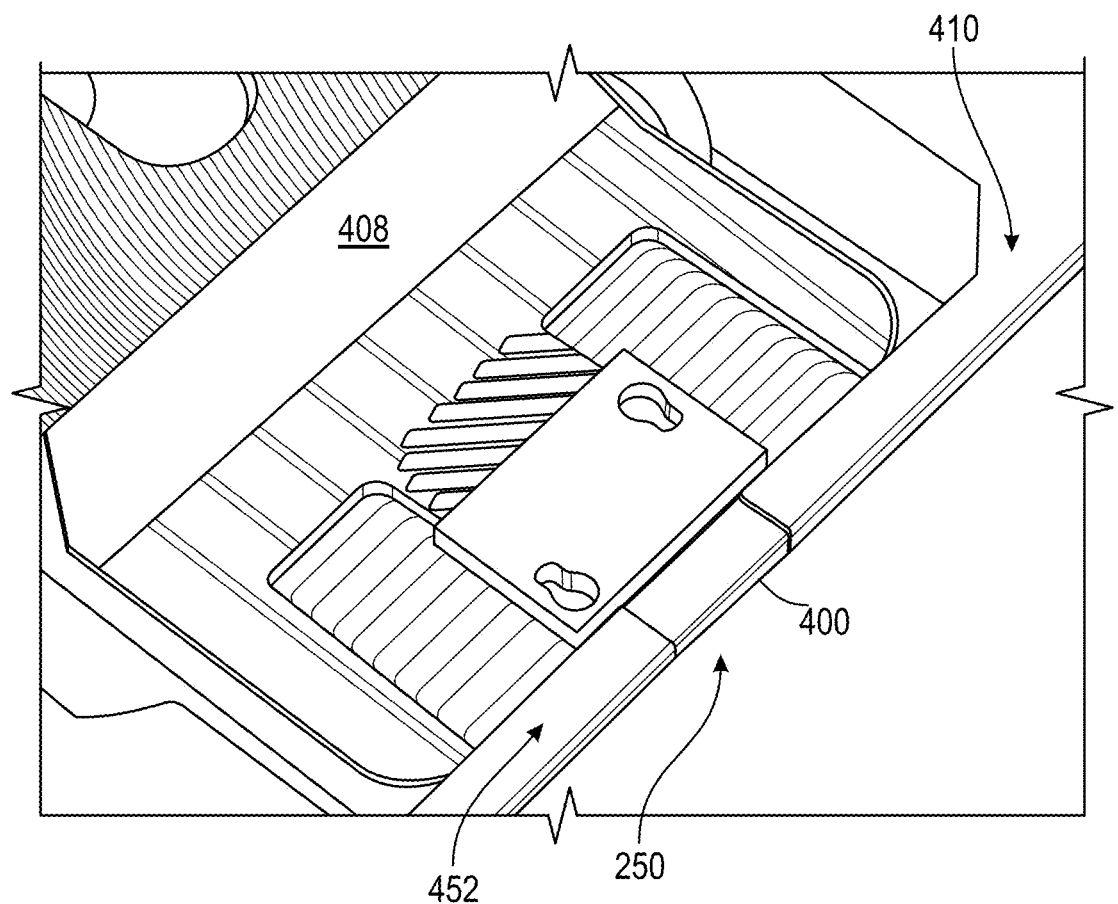
FIG. 4D illustrates the alignment of the dielectric slab to the waveguide using the alignment springs.
Figure 4E:
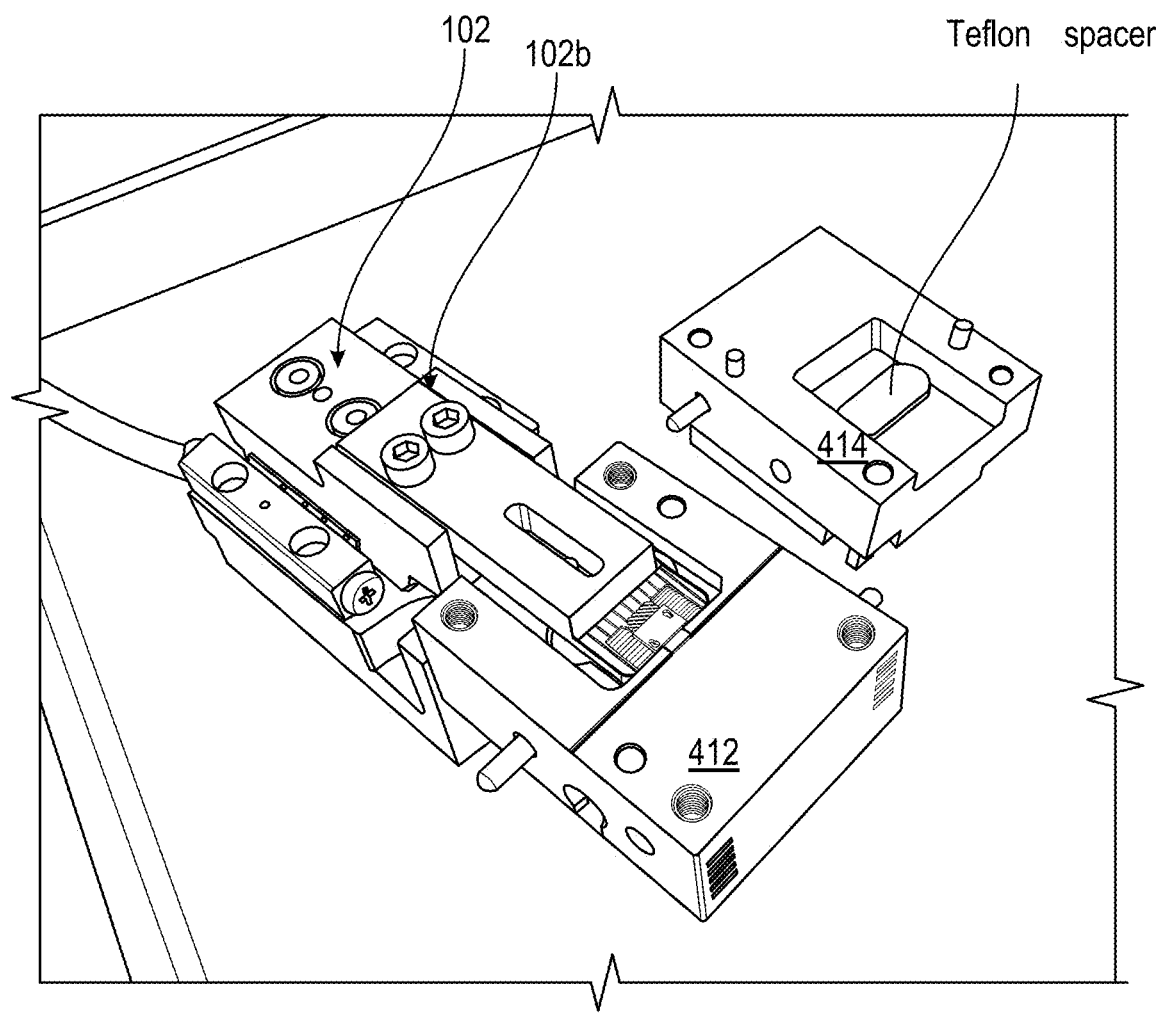
FIG. 4E illustrates a machined and assembled variable attenuator system.
Figure 4F:
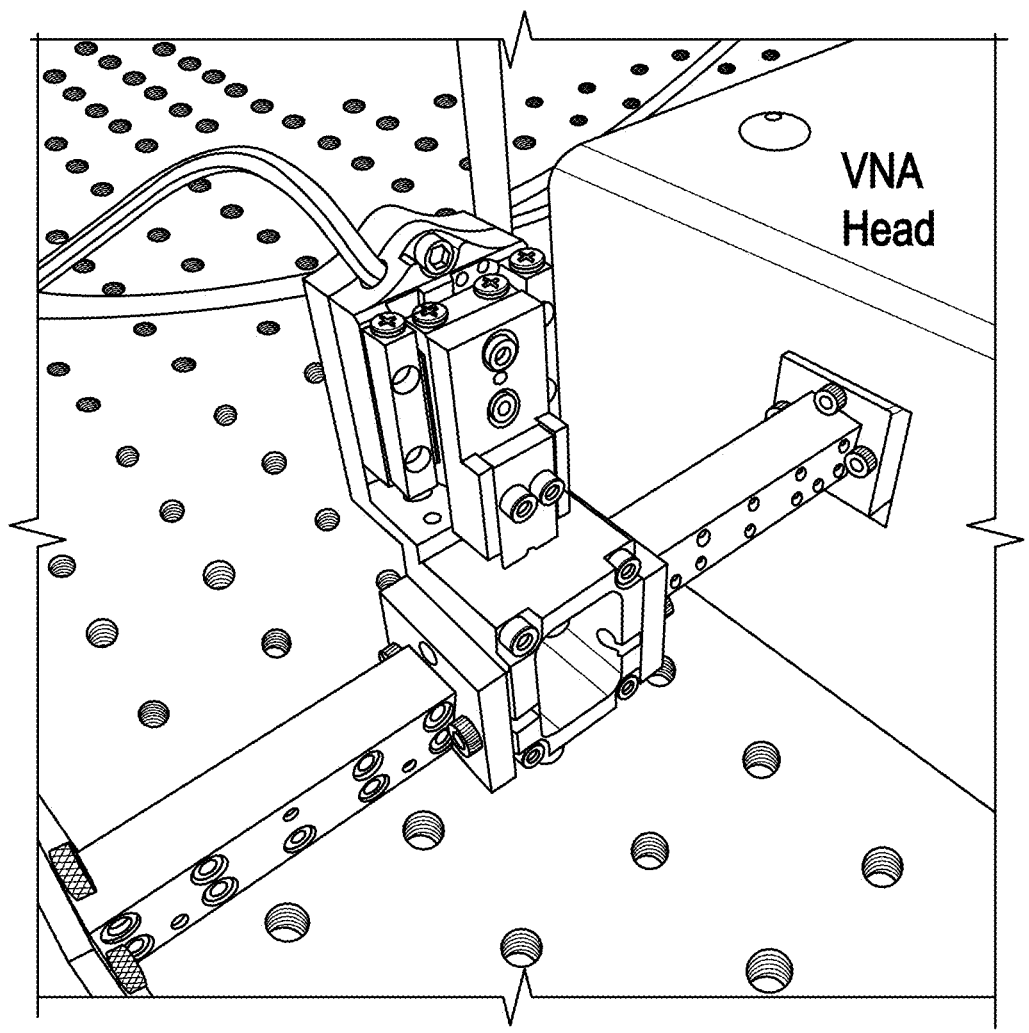
FIG. 4F illustrates coupling the attenuator system to a vector network analyzer (VNA) for measurement of the assembly in FIGS. 4E and 1A.

FIG. 4B illustrates example dimensions of a silicon slab 400 supporting a porous layer 402 comprising the attenuator. The silicon slab comprises pockets 404 for housing or seating the curved alignment springs 406 (illustrated in FIG. 4C). FIG. 4D shows a metal tray 408 seating, positioning, and holding the silicon slab 400, so that together with the alignment springs 406, the slab 400 is properly aligned in the waveguide 410 formed by metal parts 412, 414. FIG. 4F illustrates machined and assembled metal blocks 412, 414 including the waveguides and attachment to the piezoelectric motor. The tray 408 is attached to the moving stage 102b of the piezoelectric motor 102 via tray holder 108b. In one or more examples, the piezoelectric motor (as purchased from [6]) comprises an optical linear encoder or other position measuring device for providing feedback on the position of the stage 102b (and therefore also the attenuator) with nanometer precision.

The springs and pockets are positioned (e.g., on opposite corners 450 of the silicon substrate), and the curved silicon alignment spring are configured (with dimensions, shape, and spring constant), so that the springs apply forces to the sidewalls of the pockets in the silicon substrate so as to align the porous layer (comprising the pattern of holes) in an x and y direction in a plane 452 between the surfaces of the metal blocks forming the waveguide 106.

Silicon was selected as the dielectric material because it is readily available, inexpensive and the ease of micromachining/fabrication of devices in it and on it. However, other semiconductor materials might be used for the dielectric material.

Titanium is a preferable choice for the metal coating on the silicon slab because it has high absorption coefficient, enabling larger signal attenuation values. In addition, Titanium is a robust metal which provides for a durable coating.

The variable attenuator system tested herein comprises a piezoelectric motor coupled to an optical linear encoder for measuring and providing feedback of the position of the silicon slab in the waveguide, as described in [6]. The position measuring system enables tabulation or generation of a database relating position of the slab to the amount of attenuation.

Example Testing

Figure 5A:
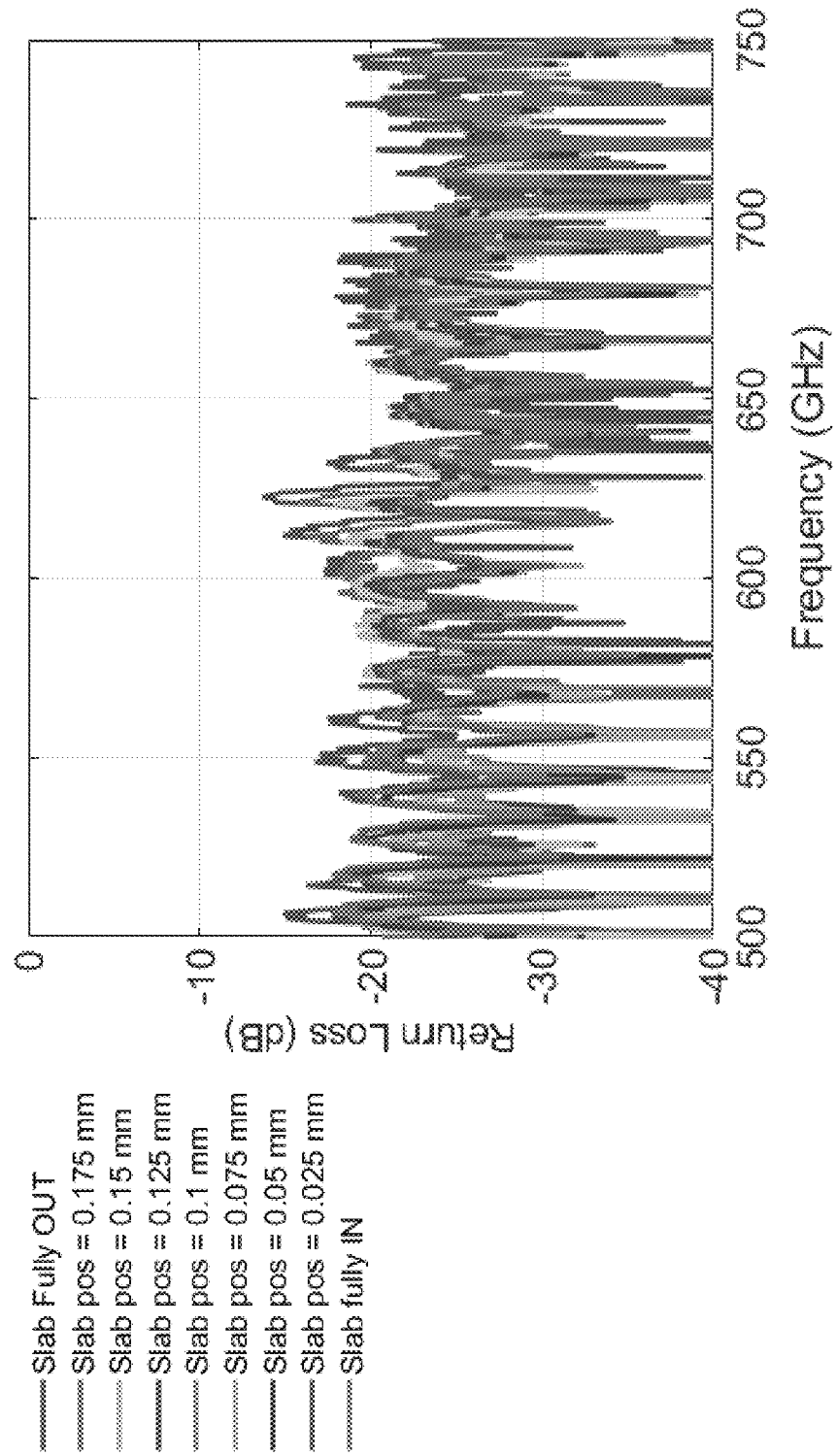
FIG. 5A illustrates measured impedance matching for different slab positions, for the embodiment of FIGS. 1A, 2A, 2C, 4E.
Figure 5B:
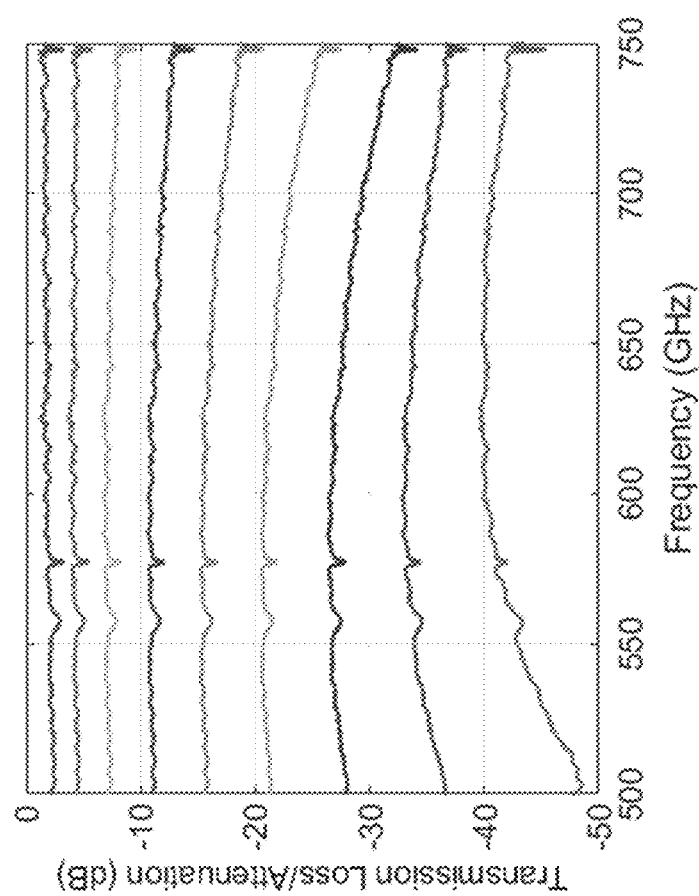
FIG. 5B illustrates measured attenuation vs frequency for different slab positions, for the device embodiment of FIGS. 1A, 2A, 2C, 4E.
Figure 5C:
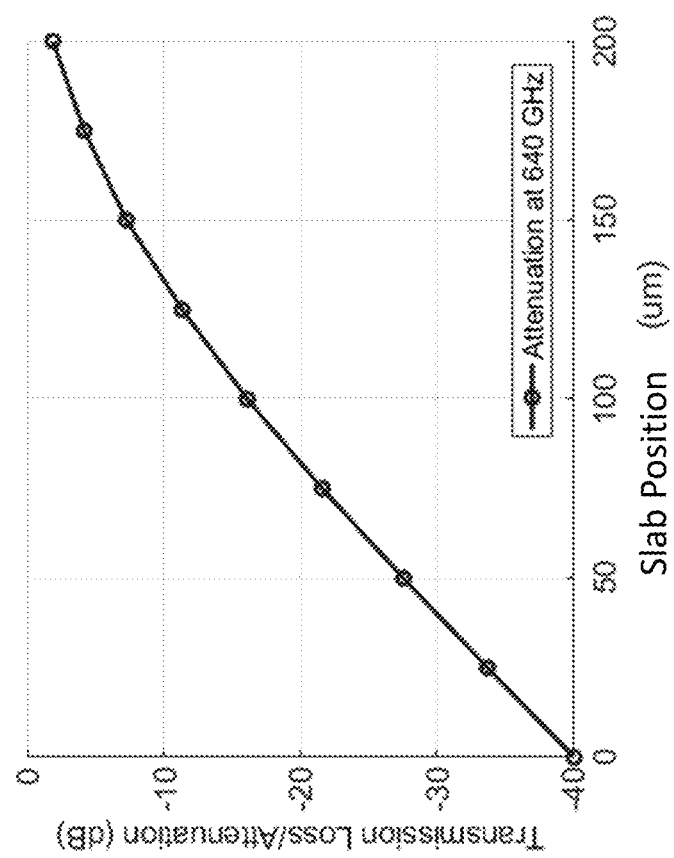
FIG. 5C plots measured attenuation vs slab position at 640 GHz, for the device embodiment of FIGS. 1A, 2A, 2C, 4E.

FIG. 4F illustrates the variable attenuator system of FIG. 1A integrated with a piezoelectric motor coupled to a vector network analyser (VNA) for measurement of the attenuator system. FIG. 5B and FIG. 5C illustrate up to 40 dB of signal attenuation was measured for silicon slab coated with a Titanium metal coating having a 25 nm thickness, demonstrating a waveguide-integrated variable attenuator at terahertz frequencies.

Possible Modifications and Variations

Figure 6A:
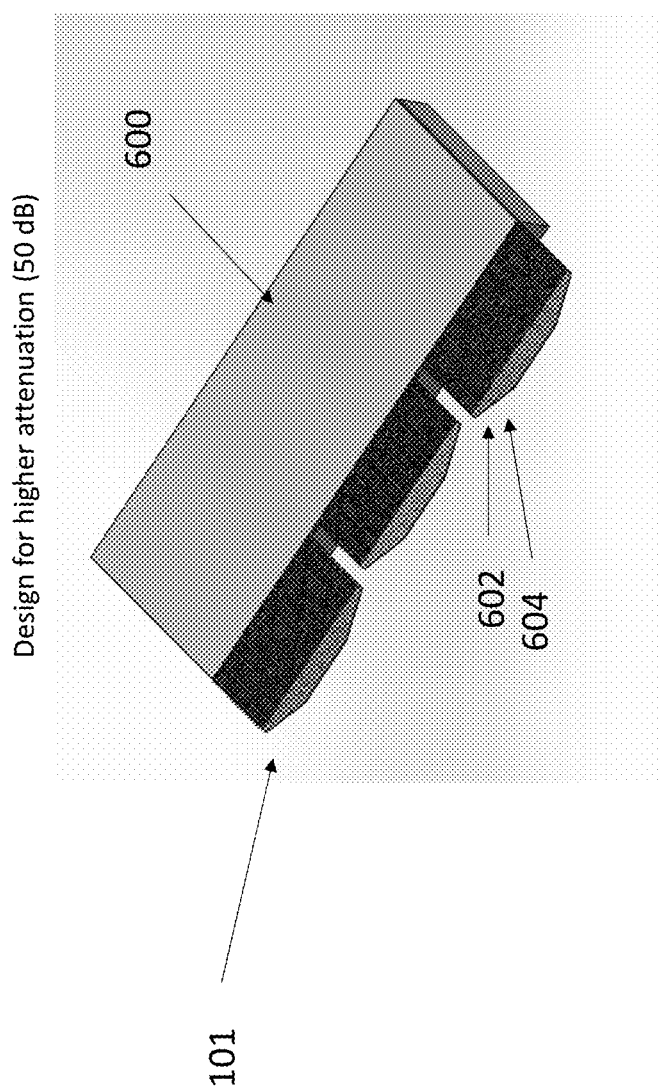
FIG. 6A illustrates an attenuator design for higher attenuation (50 dB) mounted on a handle layer.
Figures 6B, 6C:
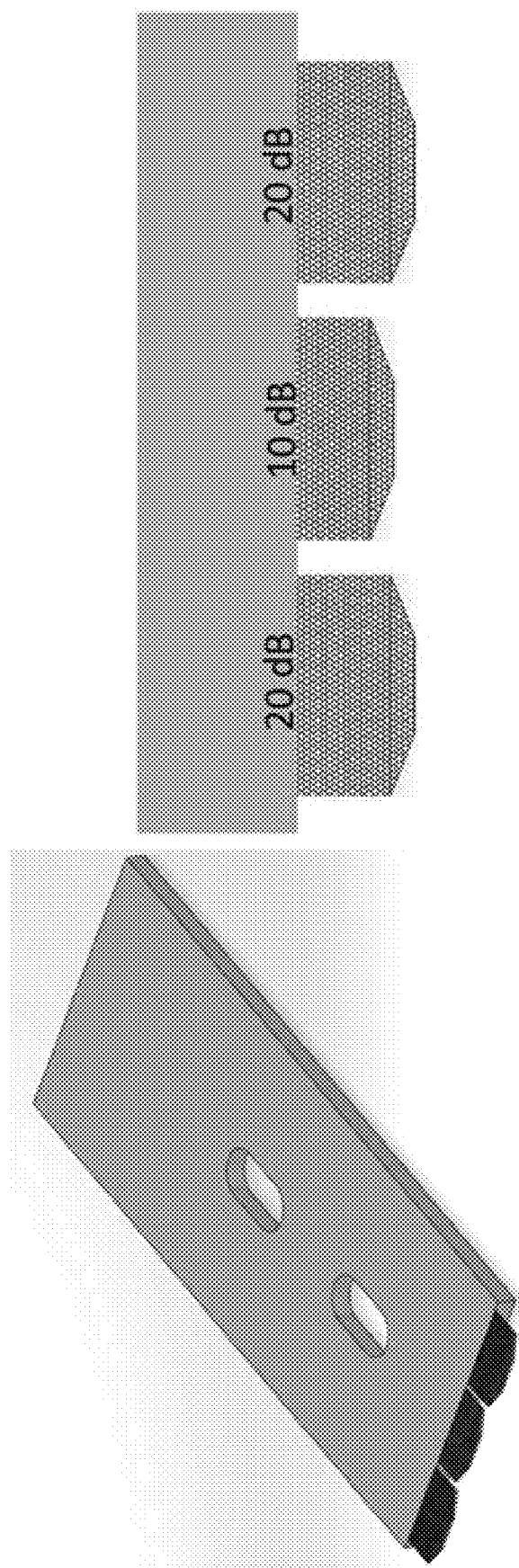
FIG. 6B-6C illustrates an attenuator design for higher attenuation (50 dB) mounted on a guide.
Figure 7B:
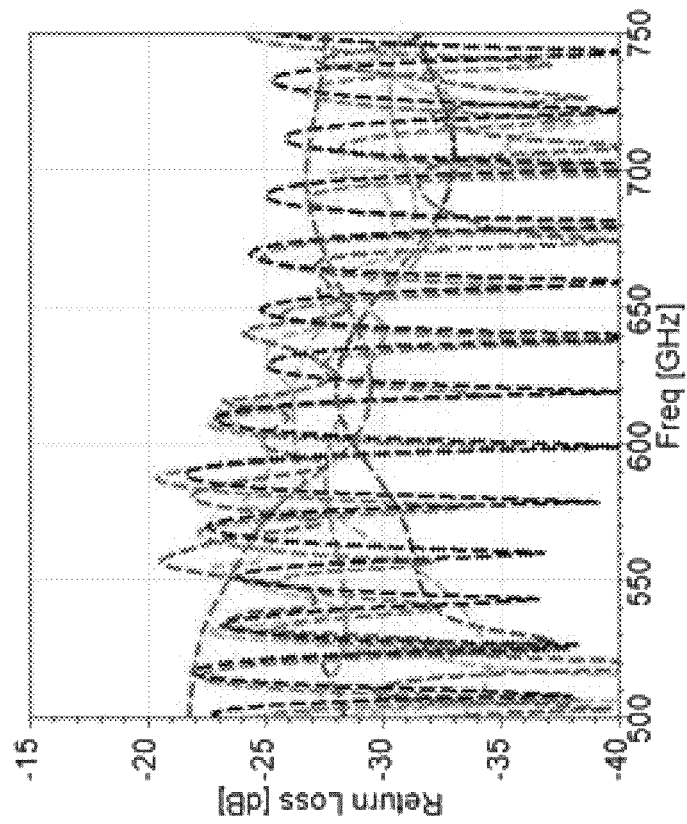
FIG. 7B. Power attenuation of an electromagnetic wave in the waveguide as a function of position of the attenuator relative to the waveguide for the embodiment of FIG. 6B-6C.
Figure 7A:
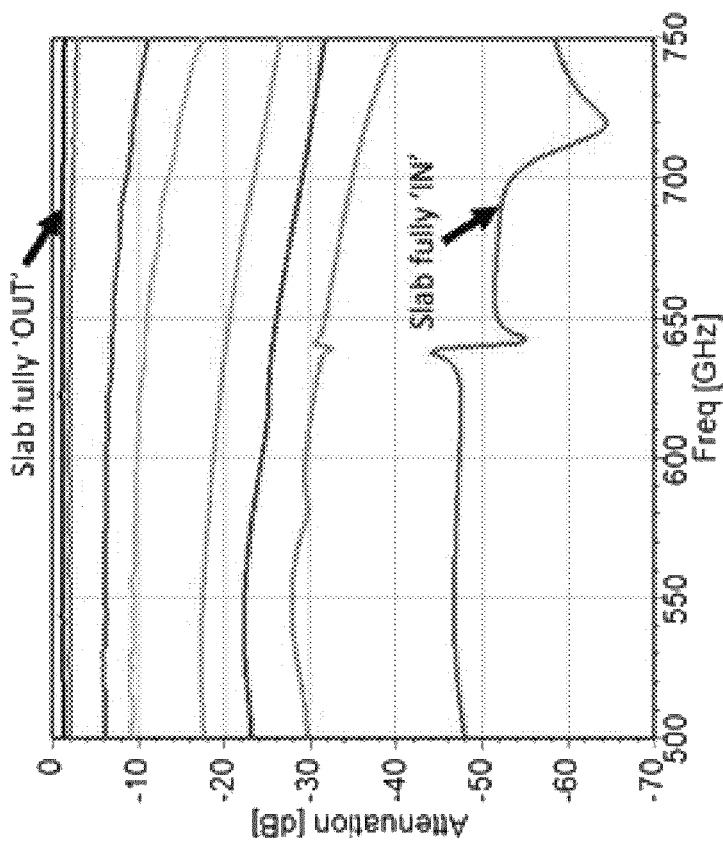
FIG. 7A plots power attenuation of an electromagnetic wave in the waveguide as a function of frequency of the electromagnetic wave and position of the attenuator relative to the waveguide, for the embodiment of FIG. 6B-6C.

FIGS. 6A-6C illustrate embodiments wherein a plurality of identical or different slabs/tips/dielectric attenuators are added to maximize the signal attenuation. As shown in FIG. 6C, the centre one of the slabs/tip is offset relative to the edge slabs/tips by 100 micrometers (for 10 dB attenuation). Use of multiple attenuators provides significant flexibility on the desired signal attenuation (~1 dB to ~50 dB), as shown from simulation results in FIG. 7A-7B.

In one or more examples, the slab 104 comprising the dielectric material has a cross-sectional shape 602 comprising an isosceles trapezoid such that the electromagnetic wave is incident on an inclined side 604 of the isosceles trapezoid for better impedance matching.

Example Applications

In one or more example applications, variable waveguide attenuators according to embodiments described herein provide, for the first time, increased reliability, flexibility, performance optimization, and tunability of local oscillator power suitable for space-based sub-millimeter-wave and terahertz instruments. Furthermore, the compact size and low power consumption of the variable attenuator system enables implementation on a CubeSat/SmallSat platforms.

Process Steps

Figure 8:
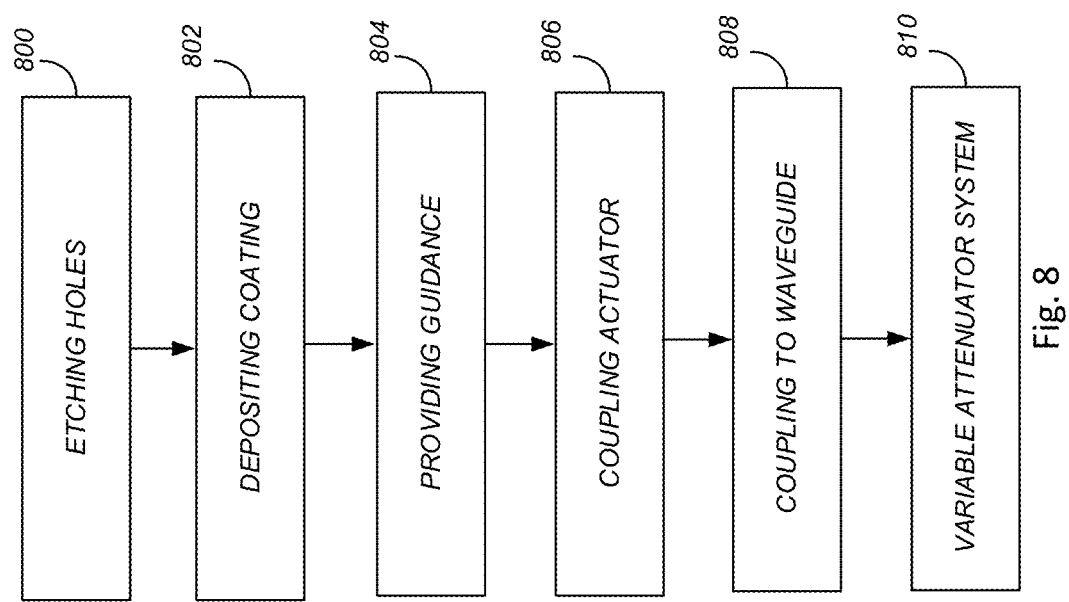
FIG. 8 is a flowchart illustrating a method of making a variable attenuator system.

FIG. 8 is a flowchart illustrating a method of making a variable attenuator system.

Block 800 represents forming (e.g., etching a dielectric material with a pattern of holes). In one or more examples, the forming comprises providing a silicon wafer including a buried oxide layer; thermally oxidizing the silicon wafer to form a first thermal oxide on the silicon wafer; depositing photoresist on the first thermal oxide; patterning the first thermal oxide with the pattern; etching the pattern of the holes using inductively coupled plasma etching; and deep reactive ion etching the silicon wafer using the first thermal oxide as a first mask and a first side of the buried oxide layer as an etch stop, to define the pattern of holes.

Block 802 represents depositing a metal coating on the dielectric material.

Block 804 represents providing guidance (e.g., tray or guide) for controlling the position or a volume of the dielectric material inserted in a waveguide to achieve a desired or pre-determined attenuation of the electromagnetic wave. The step may comprise forming pockets and alignment springs in the silicon wafer holding the porous layer or section.

Block 806 represents coupling an actuator to the dielectric material for controlling a position of the dielectric material, with nanometer resolution, in a waveguide configured and dimensioned to guide an electromagnetic wave having a frequency in a range of 100 gigahertz (GHz) to 1 terahertz (THz).

Block 808 represents coupling the dielectric material to a waveguide. In one or more examples, the waveguide is formed by machining a first metal block so as to form a first section of a waveguide in the first metal block; machining a second metal block so as to form a second section of the waveguide in the second block; and assembling the dielectric material between the first metal block and the second metal block so as to form the waveguide comprising the first section mating with the second section and the dielectric coupled to the waveguide guiding the electromagnetic wave.

Block 810 represents the end result, a variable attenuator system.

Device Embodiments

Illustrative embodiments of the inventive subject matter of the present invention include, but are not limited to, the following (referring also to FIGS. 1-7).

1. A device 100 comprising:
one or more attenuators 101 each comprising:
a dielectric material 104 comprising a porosity 200 (e.g., a pattern of holes 110 or plurality of pores 200 in the dielectric material 104, 250); and
a metal coating 112 on the top of the dielectric material;
an actuator 103 coupled to the attenuator 101, the actuator comprising:
a motor 102 coupled to a mount 108 mounting the one or more attenuators, the actuator configured to position, with nanometer resolution (e.g., position with an accuracy of 1 nm, or in a range of 1-10 nanometers (e.g., precision or accuracy 1 nanometer (nm)≤P≤10 nm), the one or more attenuators in a waveguide 106 configured and dimensioned to guide an electromagnetic wave having a frequency in a range of 100 gigahertz (GHz) to 1 terahertz (THz); and
control at least one of the position or a volume of the one or more the one or more attenuators 100 inserted in the waveguide 106 to achieve a variable or pre-determined attenuation of the electromagnetic wave transmitted through waveguide.

2. The device of example 1, wherein the pattern comprises the holes 110 having a width W, a spacing S, a shape, and an aspect ratio comprising the width divided by the unit cell area, wherein at least one of the width, the spacing, the unit cell area, the shape, and the aspect ratio tailor an impedance match of the dielectric material to the waveguide at a frequency band of interest of the electromagnetic wave.

3. The device of example 1 or 2, wherein the impedance match is such that 3% or less or 1% or less of the power of the electromagnetic wave incident (from the waveguide) on the dielectric material is reflected from the dielectric material.

4. The device of any of the examples 1-3, wherein a porosity and/or the pattern of holes are selected to tailor a permittivity of the one or more attenuators so an impedance match, characterized by a reflectivity of the dielectric material for the electromagnetic wave, is less than 10% or less than 1%, and a degree of attenuation is in a range up to 1 dB to 20 dB.

5. The device of any of the example 1-4, wherein:
the holes have a width W and a spacing S, and
an aspect ratio comprising the width divided by the unit cell area is such that the permittivity $\varepsilon$ of the attenuators is tuned in a range $1 \leq \varepsilon \leq$ permittivity of the dielectric material;
the dielectric material 250 has a thickness T1 in a range of 25-100 microns (25 micrometers $\leq$ T1 $\leq$ 100 micrometers).

6. The device of any of the examples 1-5, wherein the metal coating 112 consists essentially of titanium and the dielectric material consists essentially of silicon.

7. The device of any of the examples 1-6, wherein the metal coating 112 has a thickness T2 of 10 nm to 50 nm (10 nanometers $\leq$ T2 $\leq$ 50 nanometers, nm).

8. The device of any of the examples 1-7, wherein each of the holes is a hexagonal opening, has a hexagonal shape, or has a cross-section comprising a hexagon.

9. The device of any of the examples 1-8, further comprising a mount 600 holding a plurality of attenuators in a row, wherein at least one of the attenuators 101 is offset from the others.

10. The device of any of the examples 1-9, wherein the dielectric material 104, 250, or the slab, piece, member, or element comprising or consisting of the dielectric material, has a cross-sectional shape 602 comprising an isosceles trapezoid such that the electromagnetic wave is incident on an inclined side 604, 252 of the isosceles trapezoid for impedance matching.

11. The device of any of the examples 1-10, further comprising the waveguide 106 comprising a hollow waveguide having a rectangular cross-section and a metal surface with gold plating.

12. The device of any of the examples 1-11, further comprising:
a first metal block/part 130, 412 comprising one or more first sections of one or more waveguides;
a second metal block/part 132, 414 comprising one or more second sections of the one or more waveguides; and
the one or more attenuators 101 between the first block and the second block such that each of the first sections mate with one of the second sections to form a waveguide guiding the electromagnetic wave and each of the waveguides 106 are coupled to one or more attenuators, a top surface 256 of the attenuators faces the first block 130, a bottom 258 of the attenuators faces the second block, and the electromagnetic wave is incident on the edges of the attenuators.

13. The device of any of the examples 1-12, wherein the mount 108 comprises a silicon substrate 400 or slab and the dielectric material comprises a porous layer 250 on, connected, to or attached to the silicon substrate or slab, the silicon substrate or slab further comprising pockets 404, and the device further comprising a curved silicon alignment spring 406 housed or seated in each of the pockets, the springs and pockets positioned on opposite corners 450 of the silicon substrate 400 or slab so that the springs apply forces to the silicon substrate aligning the attenuator in an x and y cartesian direction in a plane 452 between the surfaces of the metal blocks/parts 130, 132, 412, 414 forming the waveguide 106.

14. The device of any of the examples 1-13, wherein the actuator comprises a piezoelectric motor 102.

15. The device of any of the examples 1-14, wherein the motor comprises a Microelectromechanical systems (MEMS) motor, e.g., using MEMS motor as described in [7], [8], e.g., comprising a comb drive.

16. The device of any of the examples 1-15, wherein the mount comprises a guide comprising a holder 108b and/or tray 108a interfacing the dielectric material to the motor, wherein the motor pushes the dielectric material via the holder or the tray.

17. A receiver (e.g., comprising a detector of the THz wave) or transmitter (e.g., comprising a source of the electromagnetic wave) and comprising the device of any of the examples 1-16.

18. A system comprising at least one of the receiver or the transmitter of example 17, comprising a remote sensing system, wherein the electromagnetic wave is used to perform remote sensing.

19. A system comprising at least one of the receiver or the transmitter of example 17, comprising a communications system, wherein the electromagnetic wave transmits a signal.

20. The device of any of the examples 1-19, wherein the dielectric material has a sidewall 252 inclined at an angle $\theta$ of 20 to 70 degrees with respect of a direction 254 of incidence of the electromagnetic wave 150 on the dielectric material 104, 252.

23. The device of any of the examples 1-16, wherein the waveguides 104, 106 comprise rectangular waveguides having a cross sectional area in a range of 100-5000 microns by 100-5000 microns and the connector waveguide has a length in a range of 5-10 mm.

24. The device of any of the examples wherein the motor is a piezoelectric motor that is compact and comprises direct position measurement with integrated incremental encoder (the encoder has a nm precision).

25. The device of any of the examples 1-20, wherein the waveguides are configured and dimensioned to waveguide the one or more electromagnetic waves or fields having a frequency f of 250 GHz$\leq$f$\leq$310 GHz, 500 GHz$\leq$f$\leq$750 GHz, or 220 GHz$\leq$f$\leq$600 GHz. In one or more examples, the waveguide operating at 500-750 GHz has dimensions including a cross-sectional area of about 380 microns by 190 microns.

26. A slab, body, member, wafer, or piece (e.g., comprising, consisting of, or consisting essentially of silicon) comprising the dielectric material of any of the examples 1-25.

27. The dielectric material of any of the examples, wherein the dielectric material comprises, consists, or consists essentially of silicon.

Advantages and Improvements

As waveguide-based packaging and integration methods are common at submillimetre-wave and terahertz frequencies, due to their low loss properties, it is desired that the components such as attenuators, are also based on waveguide package. Although variable attenuators are readily available at microwave frequencies, and some even up to 330 GHz [1] and [2], designing anything similar at terahertz frequencies is challenging. Some optically tuned attenuators are demonstrated [3], [4]. However, complexity of integration and bulky size limits their applicability at THz band. With ever developing high power sources and detectors at THz regime, ability to precisely control the power level of signal at these frequencies has been the need of today.

REFERENCES

The following references are incorporated by reference herein

[1] Ren, Jun et al. "High-Performance WR-4.3 Optically Controlled Variable Attenuator With 60-dB Range." *IEEE Microwave and Wireless Components Letters*, Vol. 28, pp. 512-514, 2018.

[2] C Fabeni, P. et al. "Microwave variable waveguide attenuator." *The Review of scientific instruments*. Vol. 79, no. 6, 2008.

[3] K. Sasao and Y. Monnai, "Variable Terahertz Attenuator Integrated on Nonradiative Guide Using Photoinduced Carriers," in *IEEE Transactions on Terahertz Science and Technology*, vol. 10, no. 3, pp. 256-259, May 2020.

[4] Wang, Minjie et al. "Electrically tunable hot-silicon terahertz attenuator." *Applied Physics Letters*, vol. 105, pp. 141110, October 2014.

[5] T. Nagatsuma, H. Song, and Y. Kado, "Challenges for ultrahighspeed wireless communications using Terahertz waves," *Terahertz Sci. Technol.*, vol. 3, no. 2, pp. 55-65, June 2010.

[6] https://www.pi-usa.us/en/products/precision-motorized-linear-stages/miniature-positioning-stages-motorized-precision/q-521-q-motion-miniature-linear-stage-103151 or https://www.pi-usa.us/en/products/precision-motorized-linear-stages/miniature-positioning-stages-motorized-precision/q-521-q-motion-miniature-linear-stage-103151/ or https://www.physikinstrumente.com/en/products/linear-stages/miniature-linear-stages/q-521-q-motion-miniature-linear-stage-103151/, including but not limited to all downloads, specifications, and user manuals.

[7] Low loss microelectromechanical system (mems) phase shifter by Sofia Rahiminejad, Maria A. Del Pino, Cecile D. Jung-Kubiak, Theodore J. Reck, and Goutam Chattopadhyay, US. Patent Publication No. 20210013569.

[8] IEEE TRANSACTIONS ON TERAHERTZ SCIENCE AND TECHNOLOGY, VOL. 11, NO. 5, SEPTEMBER 2021 477 A Low-Loss Silicon MEMS Phase Shifter Operating in the 550-GHz Band Sofia Rahiminejad, Maria Alonso-delPino, Theodore J. Reck, Alejandro Peralta, Robert Lin, Cecile Jung-Kubiak, and Goutam Chattopadhyay.

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A device, comprising:
one or more attenuators each comprising:
a dielectric material and a pattern of holes in the dielectric material; and
a metal coating on the top of the dielectric material;
an actuator coupled to the attenuator, the actuator comprising:
a motor coupled to a mount mounting the one or more attenuators, the actuator configured to:
position, with nanometer resolution, the one or more attenuators in a waveguide configured and dimensioned to guide an electromagnetic wave having a frequency in a range of 100 gigahertz (GHz) to 1 terahertz (THz); and
control the position or a volume of the one or more attenuators inserted in the waveguide to achieve a variable or pre-determined attenuation of the electromagnetic wave transmitted through the one or more attenuators and the waveguide.

2. The device of claim 1, wherein the pattern comprises the holes having a width, a shape, a spacing, and an aspect ratio comprising the width divided by the spacing, wherein the width, the spacing, the aspect ratio and the shape tailor an impedance match of the dielectric material to the waveguide at a frequency band of interest.

3. The device of claim 2, wherein the impedance match is such that 1% or less of a power of the electromagnetic wave incident (from the waveguide) on the dielectric material is reflected.

4. The device of claim 1, wherein the pattern of holes are selected to tailor a permittivity of the attenuators so that a reflectivity of the dielectric material for the electromagnetic wave is less than 1%.

5. The device of claim 4, wherein:
the pattern of holes control a porosity of the dielectric material so as to determine the permittivity and an impedance match of the dielectric material to the waveguide at a frequency band of interest and
a thickness of the dielectric material is selected to maintain a structural integrity for a slab of the dielectric material at the selected porosity.

6. The device of claim 1, wherein the dielectric material has a sidewall inclined at an angle of 20 to 70 degrees with respect of a direction of incidence of the electromagnetic wave on the dielectric material.

7. The device of claim 1, wherein:
the holes have a width d and a spacing S, and
an aspect ratio comprising the width divided by unit cell area is such that a permittivity of the attenuators ε is tuned in a range 1≤ε≤permittivity of the dielectric material; and
the dielectric material has a thickness in a range of 25-100 microns.

8. The device of claim 1, wherein the holes have a hexagonal shape.

9. The device of claim 1, wherein the metal coating consists essentially of titanium and the dielectric material consists essentially of silicon.

10. The device of claim 9, wherein the metal coating has a thickness of 10 nm to 50 nm.

11. The device of claim 1, further comprising the mount holding a plurality of the attenuators in a row, wherein at least one of the attenuators is offset.

12. The device of claim 1, wherein the dielectric material has a cross-sectional shape comprising an isosceles trapezoid such that the electromagnetic wave is incident on an inclined side of the isosceles trapezoid for impedance matching.

13. The device of claim 1, further comprising the waveguide comprising a hollow waveguide having a rectangular cross-section and a metal surface with gold plating.

14. The device of claim 1, further comprising:
a first metal block comprising one or more first sections of one or more of the waveguides;
a second metal block comprising one or more second sections of the one or more waveguides; and
the one or more attenuators between the first block and the second block such that each of the first sections mate with one of the second sections to form the one or more waveguides guiding the electromagnetic wave and each of the waveguides are coupled to one or more attenuators; and wherein:
a top surface of the attenuators face the first block, a bottom of the attenuators face the second block, and the electromagnetic wave is incident on side edges of the attenuators.

15. The device of claim 14, wherein the mount comprises a silicon substrate and the dielectric material comprises a porous layer on the silicon substrate, the silicon substrate further comprising pockets, and the device further comprising a curved silicon alignment spring housed or seated in each of the pockets, the springs and pockets positioned on opposite corners of the silicon substrate so that the springs apply forces to the silicon substrate aligning the one or more attenuators in an x and y direction in a plane between the surfaces of the metal blocks forming the waveguide.

16. The device of claim 1, wherein the motor comprises a piezoelectric motor.

17. The device of claim 1, wherein the motor comprises a Microelectromechanical systems (MEMS) motor.

18. The device of claim 1, wherein the mount comprises a guide comprising a holder or tray interfacing the dielectric material to the motor, wherein the motor pushes the dielectric material via the holder or the tray.

19. A system comprising a receiver or transmitter for the electromagnetic wave and comprising the device of claim 1, wherein the system comprises:
a remote sensing system and the electromagnetic wave is used to perform remote sensing, or
a communications system and the electromagnetic wave transmits a signal.

20. A method of making an attenuator, comprising:
providing a dielectric material with a pattern of holes;
depositing a metal coating on the top of the dielectric material;
coupling an actuator to the dielectric material for controlling a position of the dielectric material, with nanometer resolution, in a waveguide configured and dimensioned to guide an electromagnetic wave having a frequency in a range of 500 gigahertz (GHz) to 1 terahertz (THz),
providing guidance for controlling the position or a volume of the dielectric material inserted in a waveguide to achieve a desired or pre-determined attenuation of the electromagnetic wave, wherein the providing further comprises:
providing a silicon wafer including a buried oxide layer;
thermally oxidizing the silicon wafer to form a first thermal oxide on the silicon wafer depositing photoresist on the first thermal oxide;
patterning the first thermal oxide with the pattern;
etching the pattern of the holes using inductively coupled plasma etching;
deep reactive ion etching the silicon wafer using the first thermal oxide as a first mask and a first side of the buried oxide layer as an etch stop, to define the pattern of holes; and
further comprising:
machining a first metal block so as to form a first section of a waveguide in the first metal block;
machining a second metal block so as to form a second section of the waveguide in the second block; and
assembling the attenuator between the first metal block and the second metal block so as to form the waveguide comprising the first section mating with the second section and the attenuator coupled to the waveguide guiding the electromagnetic wave.

* * * * *